United States Patent
Glinz et al.

(10) Patent No.: US 6,231,708 B1
(45) Date of Patent: May 15, 2001

(54) METHOD AND DEVICE FOR MANUFACTURING A PNEUMATIC VEHICLE TIRE

(75) Inventors: Michael Glinz, Neustadt; Horst Sergel, Hannover, both of (DE)

(73) Assignee: Continental Aktiengesellschaft (DE)

( * ) Notice: Subject to any disclaimer, the term of this patent is extended or adjusted under 35 U.S.C. 154(b) by 0 days.

(21) Appl. No.: 09/338,025

(22) Filed: Jun. 22, 1999

Related U.S. Application Data

(63) Continuation-in-part of application No. 08/970,933, filed on Nov. 14, 1997, now Pat. No. 5,993,583.

(30) Foreign Application Priority Data

Nov. 14, 1996 (DE) .............................................. 196 47 078

(51) Int. Cl.⁷ .................................................... B29D 30/30
(52) U.S. Cl. ............................................ 156/134; 156/133
(58) Field of Search .................................... 156/134, 133, 156/157, 502, 503, 304.1, 305.5

(56) References Cited

U.S. PATENT DOCUMENTS

| | | | |
|---|---|---|---|
| 4,466,473 | * | 8/1984 | Matyja et al. ........................ 156/134 |
| 4,810,317 | * | 3/1989 | Lang ..................................... 156/134 |
| 5,830,302 | * | 11/1998 | Iseki ..................................... 156/134 |
| 5,944,926 | | 8/1999 | Hesse . |

FOREIGN PATENT DOCUMENTS

| | | |
|---|---|---|
| 0 406 821 | 1/1991 | (EP) . |
| 0 498 215 | 8/1992 | (EP) . |
| 707984 | * 4/1996 | (EP) . |

\* cited by examiner

*Primary Examiner*—Geoffrey L. Knable
(74) *Attorney, Agent, or Firm*—Robert W. Becker & Associates

(57) ABSTRACT

A method for manufacturing a pneumatic vehicle tire includes the step of folding the carcass ply in the overlap zone of the leading and trailing ends into at least one fold to form an overlength of the reinforcement elements in the overlap zone for preventing the constriction in the overlap zone within the vulcanized, inflated tire. Subsequently, in both methods, the green tire is completed on the building drum and the green tire is then vulcanized to produce the finished tire.

4 Claims, 3 Drawing Sheets

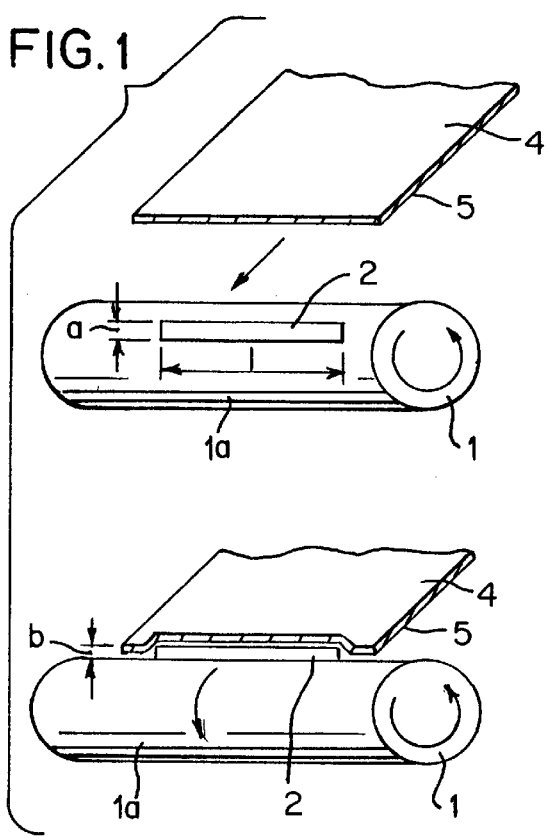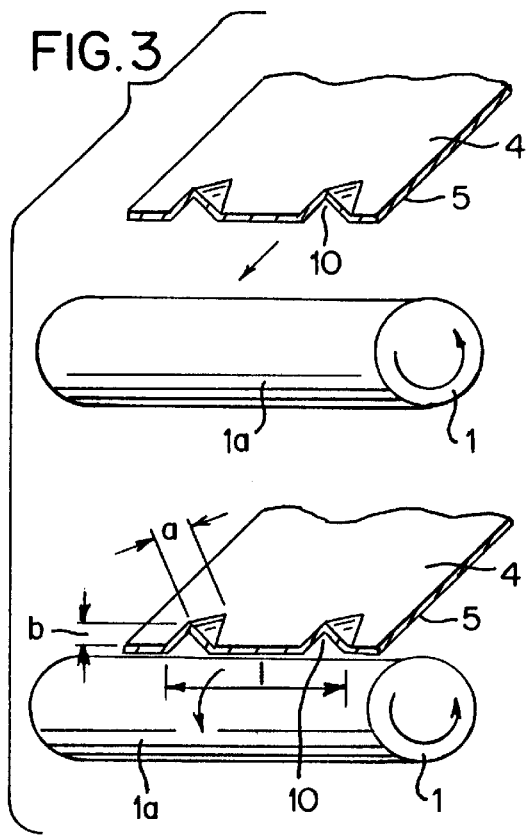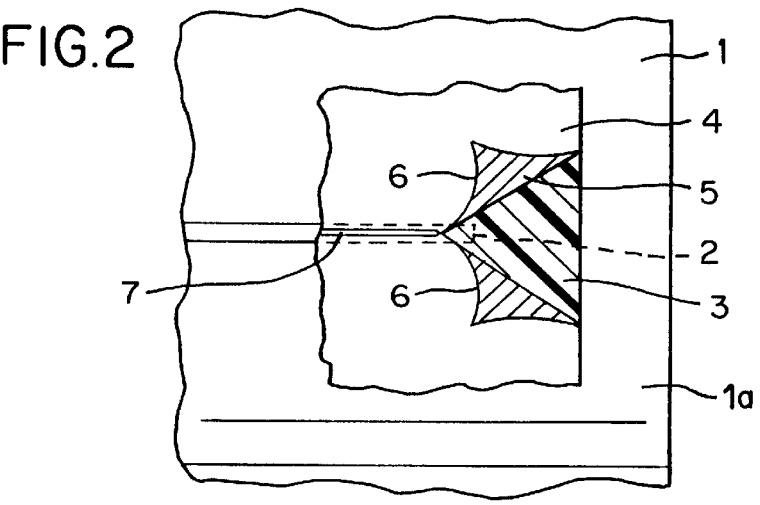

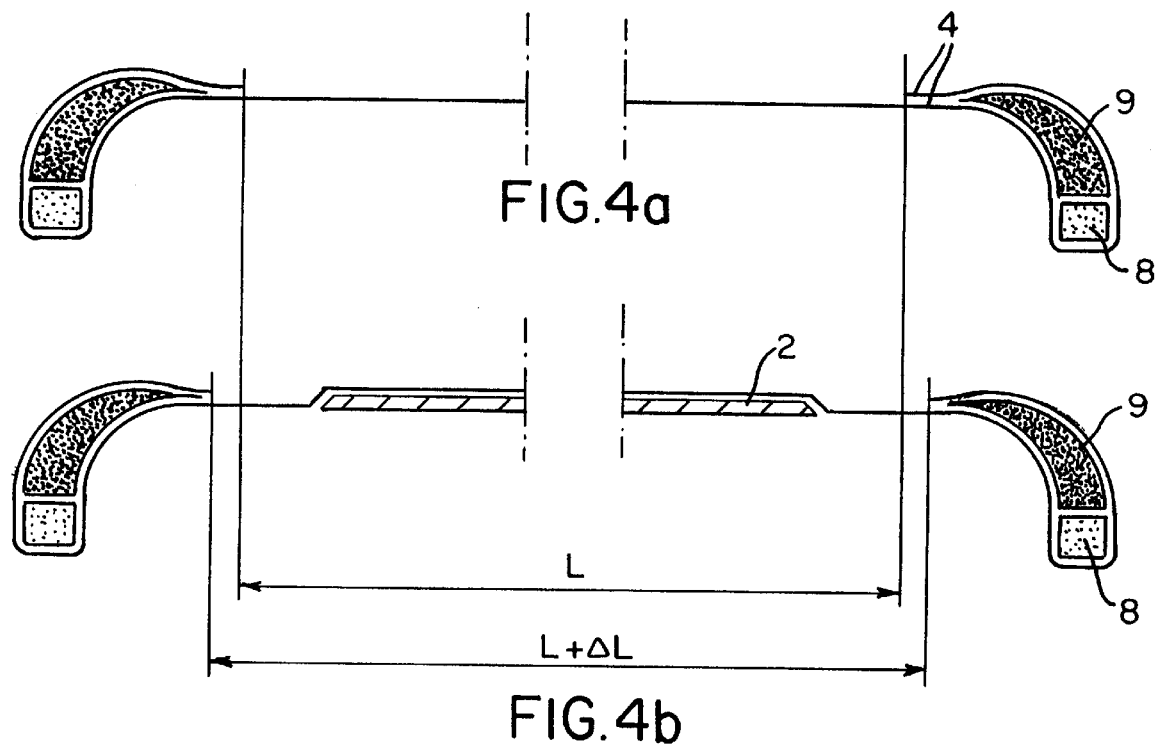

METHOD AND DEVICE FOR MANUFACTURING A PNEUMATIC VEHICLE TIRE

This application is a continuation-in-part application of Ser. No. 08/970,933, filed Nov. 14, 1997 and allowed Feb. 2, 1999 now U.S. Pat. No. 5,993,583.

BACKGROUND OF THE INVENTION

The present invention relates to a method for manufacturing a pneumatic vehicle tire by producing a green carcass on a cylindrical carcass building drum with at least the following steps:
   a) applying the inner liner onto the cylindrical carcass building drum,
   b) applying at least one carcass ply, containing textile reinforcement elements or comprised thereof, whereby the ends of the applied carcass ply have an overlap zone,
   c) positioning the bead cores,
   d) subsequently completing and vulcanizing the green tire in a conventional manner.

For the manufacture of a vehicle tire the individual components of the tire are sequentially wound onto the building drum. The individual plys are cut to strips that have a length reaching once around the drum circumference. When winding the individual strips, it is, in general, desired that the ends of each strip overlap in order to ensure that after producing and vulcanizing the green tire there are indeed closed plies in the circumferential direction which ensure the proper functioning of the finished tire.

Therefore, when applying the carcass ply, which especially in passenger car tires is comprised mostly of textile reinforcement elements embedded in rubber material, the trailing and leading ends of the applied carcass ply are overlapped. In the overlap zone (approximately 2–6 mm wide) a doubling of the material thickness is thus provided. Accordingly, the textile reinforcement elements are also present with double density. These reinforcement elements extend, for example, in the manufacture of radial tires, transverse to the circumferential direction of the building drum, and may be comprised of, for example, rayon, polyester or other organic reinforcement elements. Polyester has the advantage that it is less expensive. However, reinforcement elements consisting of polyester have the disadvantage that they have a higher stretching ability. At the overlap zone of the carcass ply in which, as mentioned above, a higher reinforcement element density is present, the same force load results in reduced stretching of the carcass ply within the overlap zone, in comparison to other carcass ply zones, when the tire is inflated because of the changed modulus of elasticity withing the overlap zone. In the inflated state of the tire, the seam is thus visible as a constriction within the sidewall. The quality and stability of the tire is not affected by this, however, this is a visual defect which especially by laymen is interpreted as a rupture within the carcass so that the tire is returned to the tire or the vehicle manufacture as a defective tire.

It is therefore an object of the present invention to prevent the constriction of the tire within the sidewall area.

SUMMARY OF THE INVENTION

A method for manufacturing a pneumatic vehicle tire according to the present invention is primarily characterized by the following steps:
   a) providing a cylindrical building drum with a bar or a depression having a longitudinal extension in a direction parallel to the orientation of reinforcement elements of a carcass ply to be applied to the building drum;
   b) positioning a lining on the cylindrical building drum;
   c) placing at least one carcass ply, comprising reinforcement elements and having a leading end and a trailing end, onto the lining such that the leading end and the trailing end overlap in an overlap zone at the bar or the depression, thereby forming an overlength of the reinforcement elements in the overlap zone for preventing a constriction of the overlap zone within the vulcanized, inflated tire;
   d) completing the green tire on the building drum;
   e) vulcanizing the green tire.

Advantageously, the step a) includes selecting the bar or the depression to have a length of 50–300 mm, a width of 8–15 mm, and a height of 3–5 mm.

Advantageously, in the step c) the overlength is produced at least within a radially outer carcass ply.

The step c) includes selecting the carcass ply to have reinforcement elements consisting of polyester.

Advantageously, the present invention also includes a method for manufacturing a pneumatic vehicle tire characterized by the following steps:
   a) positioning a lining on the cylindrical building drum;
   b) placing at least one carcass ply, comprising reinforcement elements and having a leading end and a trailing end, onto the lining such that the leading end and the trailing end overlap in an overlap zone;
   c) folding the carcass ply in the overlap zone into a least one fold to form an overlength of the reinforcement elements in the overlap zone for preventing a constriction in the overlap zone within the vulcanized, inflated tire;
   d) completing the green tire on the building drum;
   e) vulcanizing the green tire.

Advantageously, in the step c) the overlength of the reinforcement elements resulting from the at least one fold is 3–10 mm.

In the step c) the overlength is produced at least within the radially outer carcass ply.

Expediently, the step b) includes selecting a carcass ply having reinforcement elements consisting of polyester.

The present invention also relates to a carcass building drum comprising a cylindrical drum surface and a bar connected to the drum surface and extending in the axial direction of the building drum. The bar has a length of 50–300 mm, a width of 8–15 mm, and a height of 3–5 mm.

Advantageously, the invention also relates to a carcass building drum comprising a cylindrical drum surface and a depression provided in the drum surface and extending in the axial direction of the building drum. The depression has a length of 50–300 mm, a width of 8–15 mm, and a height of 3–5 mm.

Advantageously, the present invention also relates to pneumatic vehicle tires comprising a lining, beads, a carcass having textile reinforcement elements placed onto the lining and connected to the beads, whereby the tire is manufactured according to the methods of the present invention.

According to the present invention, the cylindrical carcass building drum in the overlap area of the carcass ply has a discontinuity in the form of a bar or a depression (groove). The discontinuity extends substantially parallel to the extension of the textile reinforcement elements of the carcass ply. When the carcass ply is applied to such a building drum, an overlength of the textile reinforcement elements is produced within the overlap zone and this overlength compensates the constriction that otherwise would be observed upon inflation of the finished tire within the overlap zone.

With this simple constructive measure at the cylindrical carcass building drum the problem of constriction formation within the sidewall area is solved in an uncomplicated manner. The reinforcement elements within the overlap zone have a greater length between the bead cores of the green tire than within the remaining area of the carcass ply.

It has been proven to be advantageous when the cylindrical carcass building drum has a protrusion (for example, a bar) or a depression (for example, a groove) which has a length of 50–300 mm, a width of 8–15 mm, and a height, respectively, depth of 3–5 mm. When producing a radial tire, the carcass ply is applied such that the reinforcement elements of the carcass ply extend substantially in the axial direction of the carcass building drum. The lengthwise extension of the protrusion or depression then extends also substantially in the axial direction of the carcass building drum when producing such a tire. The individual size of the depression or protrusion depends on the respective tire size to be manufactured. However, the size is selected such that an overlength of the reinforcement elements within the overlap zone is produced between the bead cores or the bead apexes whereby the remaining reinforcement elements of this carcass ply, outside of the overlap area, are not elongated. The height or depth of the protrusion or depression has a direct effect on the overlength of the textile reinforcement elements. Accordingly, an overlength of the textile material is produced which correspondence to maximally twice the height of the protrusion or the depth of the depression. The application of the carcass ply onto the cylindrical carcass building drum is performed such that the carcass ply ends within the overlap zone will follow the contour of the protrusion or depression. Since, in general, a slanted contacting of the protrusion or depression will occur, the overlength at the carcass ply is, in general, less than twice the height or depth of the protrusion or depression. However, this overlength is sufficient to produce a tire that, after vulcanization, has carcass reinforcement elements within the inflated tire that are uniformly stretched within the carcass over the entire sidewall area so that no constrictions within the sidewall are present. The length of the protrusion or the depression of the carcass building drum, as has been mentioned before, depends on the size of the tire to be produced. Advantageously, the length of the protrusion or depression is such that within the overlap area of the carcass ply an overlength is produced which within the finished (vulcanized) tire extends between the flexible areas of the sidewalls because the constrictions are visible in the lateral areas. A minimal length of the protrusion or depression (approximately 50–100 mm) has the advantage that the green tire can be easily removed.

Another method for producing an overlength of the reinforcement elements within the carcass ply in the overlap zone is folding the carcass ply so as to form at least one fold. This fold extends such that the height of the fold produces the overlength of the reinforcement elements of the carcass ply between the bead cores of the green tire. In the finished (vulcanized) tire this overlength resulting from the fold(s) prevents the sidewall constriction. The fold or folds can be produced by simply folding over the carcass ply ends within the overlap zone.

One variant of the fold formation is based on employing the radially outer areas of the carcass ply that during the further tire building steps is wound about the bead cores. Another variant for fold formation includes cutting the carcass ply in the circumferential direction in the vicinity of the future tire zenith at a location that in the finished tire will be positioned for certain underneath the belt. The carcass material for the fold(s) can then be taken from the separated zenith area. This method has the advantage that, for conventional tire sizes and dimensions, the spacing between the cut near the tire zenith and the fold is smaller than the spacing of a fold to the radially outer area to be wound about the bead core. Accordingly, the area or length across which the carcass material must be pulled into the fold is much smaller.

Preferably, the carcass ply should be folded to such an extent that a material overlength of 3 mm to 10 mm is produced, i.e., the complete length of the entire folded material is 3 to 10 mm. Folding of the carcass ply does not require to position the carcass ply at a certain location on the building drum during winding, and this is advantageous with respect to the green tire manufacture.

The folding of the carcass ply can be performed before placing it onto the building drum or can be produced after the carcass has been placed onto the building drum. For the second variant (cutting the carcass) it was found to be beneficial to perform the cut and the folding at the time of cutting the carcass material strip to length on the building drum. The circumferential cut should have such a length that it corresponds substantially to the length of the fold in the circumferential direction. When both the leading end and the trailing end (leading and trailing is used in reference to the winding direction on the building drum) of the carcass ply to be overlapped during tire building are provided with folds and cuts, positioning of two cuts atop one another when dishing the green tire should be avoided. It is advantageous to position the cut at the leading end to the left of the zenith and the cut at the trailing end of the carcass ply to the right of the zenith or vice versa. In this manner, it can be prevented that during dishing of the tire irregular deformations would result upon congruent placement of two cuts.

In order to prevent the constriction formation within the sidewall area, it is sufficient to provide at least the radially outer carcass ply in the overlap zone with an overlength when a carcass is produced of multiple plys (for example, for light truck tires). Since the constriction within the sidewall area is especially caused by the radially outer carcass ply, this variant of the method is especially advantageous.

Inventively, a pneumatic vehicle tire is produced that has carcass plies comprised of reinforcement elements, preferably consisting of polyester and embedded in rubber material. When producing the green tire on the building drum, such carcass plies are advantageous with respect to handling. However, it is, in principle, also possible that the carcass ply is formed only by reinforcement elements, i.e., that an embedding between two rubber layers is not required. The application of such reinforcement elements onto the inner lining material can be achieved by winding. Reinforcement elements for this purpose are preferably made of polyester, but also of rayon or arramid. Inventively, pneumatic vehicle tires are produced which can be manufactured without great technical expenditure and which are free of the unsightly constrictions within the sidewall.

BRIEF DESCRIPTION OF THE DRAWINGS

The object and advantages of the present invention will appear more clearly from the following specifications in conjunction with the accompanying drawings, in which:

FIG. 1 shows schematically the steps of generating the overlength of a carcass ply by providing a bar at the carcass building drum;

FIG. 2 shows a plan view of a carcass building drum;

FIG. 3 shows schematically the steps of generating the overlength at the carcass ply by folding;

FIGS. 4a and 4b shows part of a cross-sectional view of the green tire carcass;

DESCRIPTION OF PREFERRED EMBODIMENTS

Figure 5A:
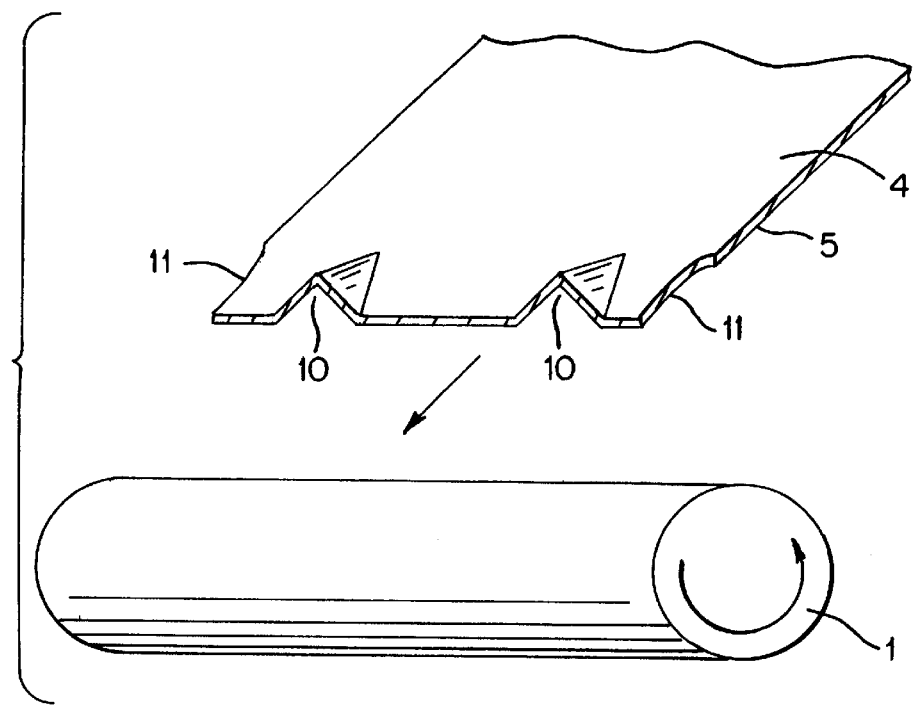
FIG. 5a illustrates folding of the carcass ply to form an overlength by taking material from the radially outer sides.

The present invention will now be described in detail with the aid of several specific embodiments utilizing FIGS. 1–5b.

FIG. 1 shows a cylindrical carcass building drum 1 with cylindrical drum surface 1a, for example, for the manufacture of a radial tire of the size 195/70 R 15. On the drum surface 1a a metallic bar 2 is fastened. This bar 2 can be attached, for example, by using an adhesive or by screwing it to the carcass building drum. The bar is approximately 12 mm wide (a), approximately 4 mm tall (b) and approximately 250 mm long (l). The ends of the bar 2 are preferably rounded. In addition, FIG. 1 shows how, in principle, the winding of the carcass ply 4, which contains reinforcement elements 5 embedded in rubber material, is applied to the tire building drum 1. The reinforcement elements 5 are arranged such that they extend substantially in the axial direction of the carcass building drum (warp) and that some of them are oriented in the circumferential direction (weft). The latter only have a minimal impact in regard to the construction of the tires so that they have essentially no effect on the sidewall constriction.

In principle it is also possible to use, instead of the bar 2, a groove within the carcass building drum. The applied carcass ply 4 can then be forced into the groove either by applying a vacuum or by forcing it in to the groove with a stamp or plunger.

For producing the green tire (represented in FIG. 2) the inner lining 3 is first placed onto the carcass drum 1. The ends of the inner lining 3 can be positioned so as to have abutting ends, but they can also produce an overlap. Due to the presence of the bar 2, which is inventively mounted on the carcass building drum 1, an overlength within the inner lining material is also produced which, however, has no effect on the quality or the appearance of the tire. Onto the inner lining 3 the carcass ply 4 is applied. The carcass ply 4 comprises reinforcement elements 5 of polyester embedded in rubber material. The trailing end and leading ends 6 of the carcass ply 4 overlap on the bar 2 within the overlap zone 7. The overlap zone 7 of the two carcass ply ends 6 is approximately 5 mm. After applying the carcass ply 4, further tire components (for example, bead cores, bead apexes) are applied to the carcass building drum whereby the two bead cores/bead apexes are positioned external to the bar 2 of the carcass building drum. After application of further tire components such as the belt, the green tire is dished. Subsequently, the tread strips and sidewalls are applied and the green tire is then vulcanized. In principle, the production of an overlength within the carcass ply is not only possible for the manufacture of the above described radial tires, but also for diagonal tires.

FIG. 3 shows the scenario in which the overlength of the reinforcement elements 5 of the carcass ply 4 is produced by forming two folds 10. The width of a fold, with respect to the circumferential direction of the carcass building drum, has a value a (approximately 10 mm), while the height b is approximately 5 mm and the distance l between the two folds is approximately 250 mm. These values also refer to a radial tire of the size 195/70 R 15. A carcass ply folded as disclosed is used for producing a green tire in a conventional manner. The folds of the carcass ply can be produced before application of the carcass material onto the building drum or directly on the building drum.

The representations of FIGS. 4a and 4b will be used to explain in more detail how the inventive overlength of the reinforcement elements 5 of the carcass ply 4 is produced by the bar 2 or the fold 10 in a schematically simplified cross-sectional view of the inventive green tire as compared to a conventional tire. FIG. 4a (conventional tire) and 4b (inventive tire) show a carcass ply 4 which is folded about the metallic bead cores and the bead apexes 9. The height of the bar 2 on which the carcass ply 4 rests, respectively, the height of the fold 10 produces an overlength ΔL of the reinforcement elements 5 of the carcass ply between the two bead cores/bead apexes. This overlength ΔL which is less than twice the height of the bar 2 or fold 10, i.e., in the case of the bar 2 is less than 8 mm, compensates shrinkage of the textile reinforcement elements (polyester) of the carcass ply so that constrictions within the sidewall area are prevented.

FIG. 5a shows a first variant of how an overlength of the carcass ply 4 with reinforcement elements 5 is produced by forming two folds 10. The folds 10 are created by pulling material from the radially outer area (at 11) toward the center (zenith area) of the tire to be built.

Figure 5B:
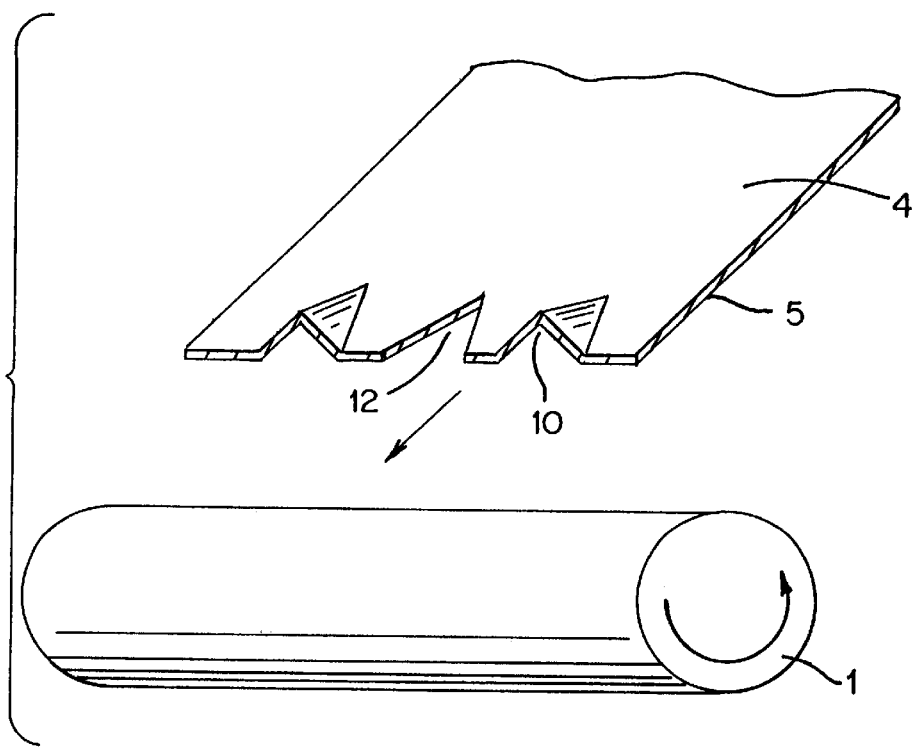
FIG. 5b illustrates cutting at the zenith area of the carcass ply in order to provide carcass material for the folds.

FIG. 5b shows a second variant of how an overlength of the carcass ply 4 with reinforcement elements 5 is produced by forming two folds 10. In this variant, a circumferential cut is performed in the zenith area and the carcass ply material is then pulled away from the cut into the folds 10, whereby a gap 12 at the zenith area results where the cut was performed. The cut preferably has the same length as the length a of the fold (see illustration of the fold length a in FIG. 3).

The present invention is, of course, in no way restricted to the specific disclosure of the specification and drawings, but also encompasses any modifications within the scope of the appended claims.

What is claimed is:

1. A method for manufacturing a pneumatic vehicle tire, said method comprising the steps of:
   a) positioning a lining on the cylindrical building drum;
   b) placing at least one carcass ply, comprising reinforcement elements and having a leading end and a trailing end, onto the lining such that the leading end and the trailing end overlap in an overlap zone;
   c) folding the carcass ply in the overlap zone into at least one fold to form an overlength of the reinforcement elements in the overlap zone for preventing a constriction in the overlap zone within the vulcanized, inflated tire;
   d) completing the green tire on the building drum;
   e) vulcanizing the green tire.

2. A method according to claim 1, wherein in the step c) the overlength of the reinforcement elements resulting from the at least one fold is 3 to 10 mm.

3. A method according to claim 1, wherein in the step c) the overlength is produced at least within a radially outer carcass ply.

4. A method according to claim 1, wherein the step b) includes selecting a carcass ply having reinforcement elements consisting of polyester.

* * * * *